United States Patent [19]

Farry et al.

[11] Patent Number: 5,848,261

[45] Date of Patent: Dec. 8, 1998

[54] SYSTEM AND METHOD FOR REMOTE PRINTER EMULATION IN A NETWORK

[75] Inventors: Mohsen Farry, Calabasas; Harish K. Malhotra, Tarzana, both of Calif.

[73] Assignee: Quotron Systems, Inc., Los Angeles, Calif.

[21] Appl. No.: 603,506

[22] Filed: Feb. 20, 1996

Related U.S. Application Data

[63] Continuation of Ser. No. 236,896, May 2, 1994, abandoned.

[51] Int. Cl.[6] ........................................................ G06F 3/00
[52] U.S. Cl. .................................... 395/500; 395/112
[58] Field of Search ..................................... 395/500, 112

[56] References Cited

U.S. PATENT DOCUMENTS 4,603,385  7/1986  Mueller et al. .......................... 395/500
4,641,263  2/1987  Perlman et al. ......................... 395/500
4,829,468  5/1989  Nonaka et al. ......................... 395/117
4,939,670  7/1990  Freiman et al. ........................ 395/110
5,025,398  6/1991  Nelson .................................... 395/112

Primary Examiner—Parshotam S. Lall
Assistant Examiner—Kenneth R. Coulter
Attorney, Agent, or Firm—Baker, Maxham, Jester & Meador

[57] ABSTRACT

An interactive computer system having one or more user terminals connected to at least one host server via a network system and having a printer connected to one of the host servers includes a print manager interface in each user terminal that detects output generated by an application, prepares the output for transmission to a host server, and initiates transmission of the prepared output in accordance with the network protocol, and also includes a host printer interface in each host server that receives prepared output from a user terminal and creates a host print process that initiates printing of the prepared output at a printer designated by the application process.

34 Claims, 5 Drawing Sheets

SYSTEM AND METHOD FOR REMOTE PRINTER EMULATION IN A NETWORK

This application is a File Wrapper Continuation of application Ser. No. 08/236,896, filed May 2, 1994, now abandoned.

BACKGROUND OF THE INVENTION

1. Field of the Invention

This invention relates generally to network printing and, more particularly, to sending output from a user terminal to a remote printer attached to a network server.

2. Description of the Related Art

Many computer systems comprise user terminals connected to one or more host servers by a network system. The user terminals frequently comprise personal computers that are compatible with the IBM Corporation Personal Computer (PC) and operate in accordance with a graphical user interface such as the "Microsoft Windows" operating system by Microsoft Corporation. The host servers typically comprise computers that can also be IBM PC-compatible or can be more powerful machines, such as IBM Corporation "RS/6000" workstations. Host servers can operate according to the same operating system as the terminals or can operate in accordance with a different operating system. Many host server machines, for example, operate in accordance with the well-known UNIX standard. The network system provides a transport layer that permits the terminals and host servers to communicate in accordance with a network protocol. Two common network protocols are TCP/IP and IPX. A network of this type is advantageous because it permits the sharing of resources, such as sharing of data libraries and printers.

Operating systems, such as the Microsoft Windows operating system, provide an interface for application programs to send their output for printing. For example, when a user at a terminal wants to send output to a printer, an operating system application (called Print Manager in Microsoft Windows) directs the output to a user-specified printer. The network system provides a means of receiving output, preparing it for transmission to the host server, and establishing communication. After a communication channel has been opened, a network process of the terminal sends the output to a receiving port of the host server. The network vendor typically provides software processes that support getting the output and providing it to a connected printer.

Although several network protocols have come into relatively widespread use, such as the above-referenced TCP/IP and IPX, for example, the version of network protocol supported by one network system vendor is not necessarily compatible with the version of the same network protocol by another vendor. In particular, each system vendor supplies a system layer called a TCP/IP stack that is different for each vendor. The TCP/IP stack resides between the user application layer and the TCP/IP protocol. The TCP/IP stack provides an application programming interface.

Frequently, customers will equip all terminals of a network with network software from the same vendor to avoid any compatibility problems in communication. Similarly, operating systems and some application programs may have to be carefully selected for compatibility with each other and with the network. Thus, many customers are essentially "locked in" to a vendor of network software after an initial purchase decision has been made.

At times, it might be desirable to add additional terminals or host servers with a variety of operating systems to increase capabilities or to take advantage of new technologies or developments. Unfortunately, additional difficulties can be encountered if the operating system of the host server is different from the operating system of one or more user terminals.

For example, all user terminals might operate in accordance with the Microsoft Windows system, while the host server might operate in accordance with the UNIX system. In such a case, it is not unusual for the network customer to be faced with purchasing an additional suite of software programs from the network vendor for each terminal to permit sending Microsoft Windows-generated output to the UNIX-based host server for printing. For a large network with many terminals, the additional expense can be significant. Thus, it can be prohibitively expensive to add a new host server to a network that operates in accordance with a different operating system or add terminals that operate in accordance with different operating systems.

Part of the advantage of networks is shared resources. Some limitations on sharing, however, are not necessarily alleviated by networks. Those skilled in the art will recognize that the Microsoft Windows operating system permits printers to be specified in a Printer Setup dialog box from a Control Panel window. A Microsoft Windows application that generates output provides the system application called Print Manager with font and file information, as well as the application output. Print Manager then directs the printing of the output to the specified printer.

Those skilled in the art will appreciate that a personal computer typically has several line printer parallel ports typically specified as LPT1, LPT2, LPT3, and so forth. When printers are set up in the dialog box, they typically are connected to one of these ports. Most personal computers have, at most, two or three LPT ports. Thus, regardless of the number of printers that might be supported by the host server, only one of two or three can be selected at a time. It would be advantageous if additional printers were available to the network users. It also would be advantageous if the network user could more easily send application output to a host server having a different operating system.

It also would be advantageous for network users to have more printing options available to them without additional complexity and expense. For example, the UNIX standard supported by many network vendors provides a single spooling protocol for print jobs. Those skilled in the art will appreciate that a spooling protocol determines how print jobs are handled when the supporting host server has insufficient memory space available to contain a print job or otherwise cannot immediately print the application output. A network vendor typically supports a standard network protocol spooling scheme, or supports a vendor-standard spooling scheme. It can be difficult and more costly to implement a different or additional spooling scheme, should it be desired by a user.

These considerations are especially important in the computer networks generally used by the financial markets. It is not unusual for users in financial markets to have a need for access to a relatively large number of printers beyond the two or three typically accessible to a user terminal. Presently, it might be necessary to configure different terminals at the same site to permit access to the required number of printers. In addition, users in financial markets have a need to support more than one type of spooling scheme. For example, data base reports, market transactions, and user e-mail might require different spooling schemes for their respective output.

From the discussion above, it should be apparent that there is a need for a network system that provides greater flexibility in supporting multiple printers connected to user terminals and non-compatible operating systems and that permits network users greater flexibility in adding new or additional elements to the network. The present invention satisfies this need.

SUMMARY OF THE INVENTION

In accordance with the invention, an interactive computer system having one or more user terminals connected to at least one host server via a network system and having a printer connected to one of the host servers includes a print manager interface in each user terminal that detects output generated by a user terminal application, prepares the application output for transmission to a host server, and initiates transmission of the prepared output in accordance with the network protocol, and also includes a host printer interface in each host server that receives prepared output from a user terminal and creates a host server print process that initiates printing of the prepared output at a printer designated by the application output.

In one aspect of the invention, the user terminals and host server can operate in accordance with different operating systems. For example, the user terminals may operate in accordance with the Microsoft Windows operating system while the host server may operate in accordance with the UNIX operating system. In accordance with the invention, a printer attached to a host server can be easily used by multiple user terminals having incompatible operating systems. In this way, the invention can support user terminals having a variety of operating systems at reduced cost when compared with the typical expense of vendor systems in providing such support.

In another aspect of the invention, the host printer interface can support a user-defined spooling process in addition to the spooling process provided by the host server operating system and permits selecting between the two at the user terminal. In this way, user terminals having different operating systems or operating with different network vendor systems can have access to common spooling schemes.

In yet another aspect of the invention, the number of printers that can be accessed by a user terminal is not limited to the number of printer ports at the user terminal. Rather, a relatively large number of host server-attached printers can be designated as the destination for output from application programs of the user terminal. In this way, the sharing of network resources can be dramatically increased and additional printers that are added to the network can be easily accommodated.

Other features and advantages of the present invention should be apparent from the following description of the preferred embodiment, which illustrates, by way of example, the principles of the invention.

DESCRIPTION OF THE PREFERRED EMBODIMENT

Figure 1:
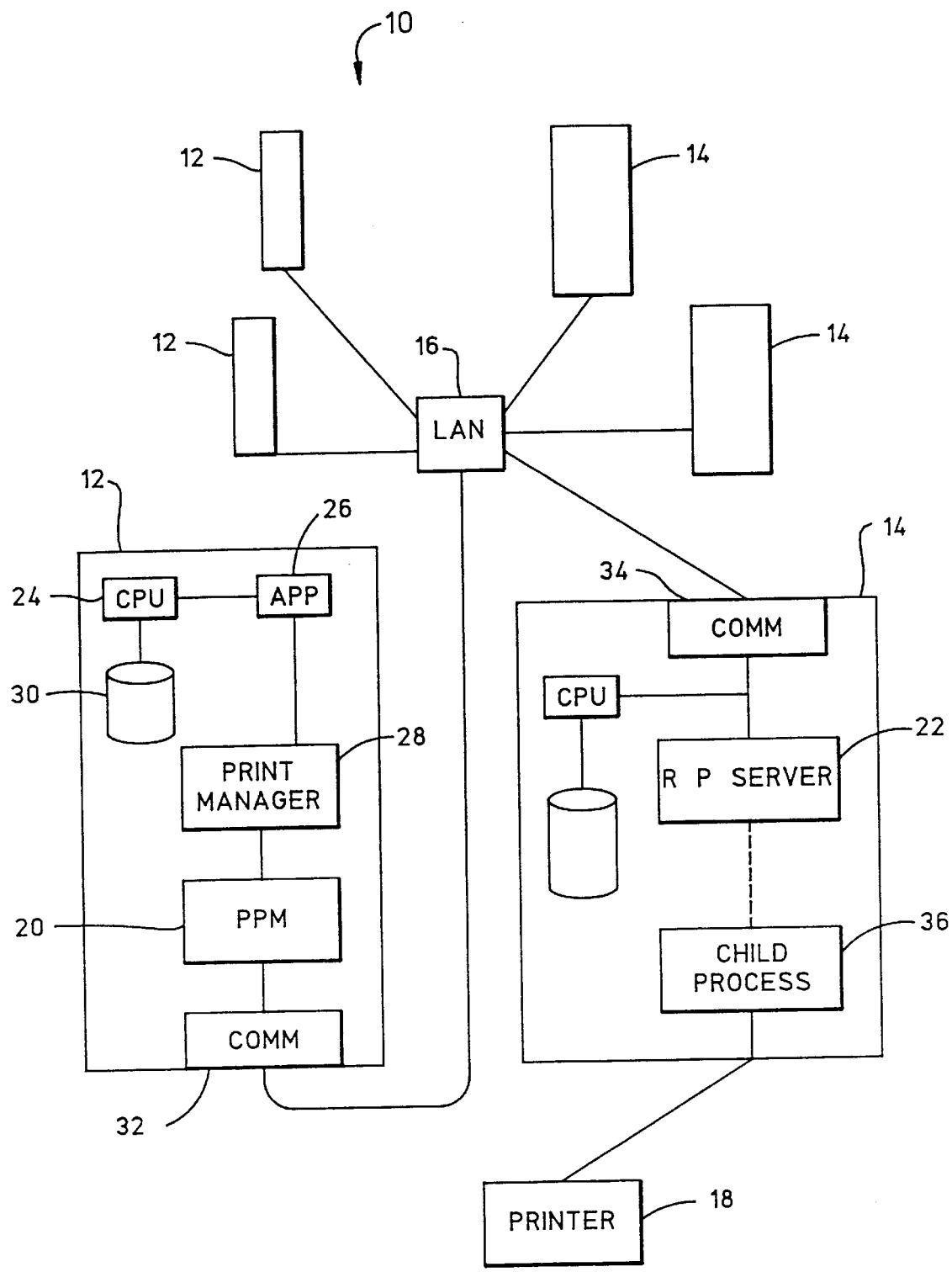
FIG. 1 is a block diagram of an interactive computer system constructed in accordance with the present invention.

FIG. 1 shows a computer system 10 constructed in accordance with the present invention having a plurality of user terminals 12 connected to a plurality of host servers 14 via a network system 16. A printer 18 is attached to one of the host servers. The internal details of only one user terminal and one host server are shown for simplicity, but should be understood to apply to the remaining user terminals and host servers as well. The user terminals operate in accordance with an operating system, such as the "Microsoft Windows" operating system (not illustrated), that is not compatible with the host server operating system, such as the UNIX system (not illustrated). Each user terminal includes a print manager interface 20 (identified as QPM) and each host server includes a host printer interface 22 (identified as RP SERVER) that permit the user terminals to easily send output to the remote printer 18. In addition, although each user terminal includes three parallel printer ports (not illustrated), the print manager interface 20 permits up to thirty-two printers to be designated for receipt of user terminal output. Finally, the host printer interface 22 supports a plurality of spooling protocols that may be specified by the user terminals.

Because the preferred embodiment illustrated in the drawings includes Microsoft Windows-based user terminals and UNIX-based host servers, many references will be made to various Microsoft Windows and UNIX constructs, features, and processes. It should be understood, however, that such references are for purposes of illustration only. Those skilled in the art will appreciate the large number of alternative operating systems and combinations thereof to which the present invention can be applied.

Each user terminal 12 includes a central processor unit (CPU) 24 that supports one or more applications programs 26 in accordance with its operating system. The applications programs generate output that is directed by a user operating system print manager 28, such as the Microsoft Windows Print Manager application, to a temporary data file located in data memory 30 of the user terminal. The print manager interface 20 detects the output data file and prepares the output file for transmission to a host server designated by the application 26, and then initiates transmission of the output in accordance with the network protocol. A terminal communication interface 32 provides an interface between the user terminal 12 and the network 16.

Figure 2:
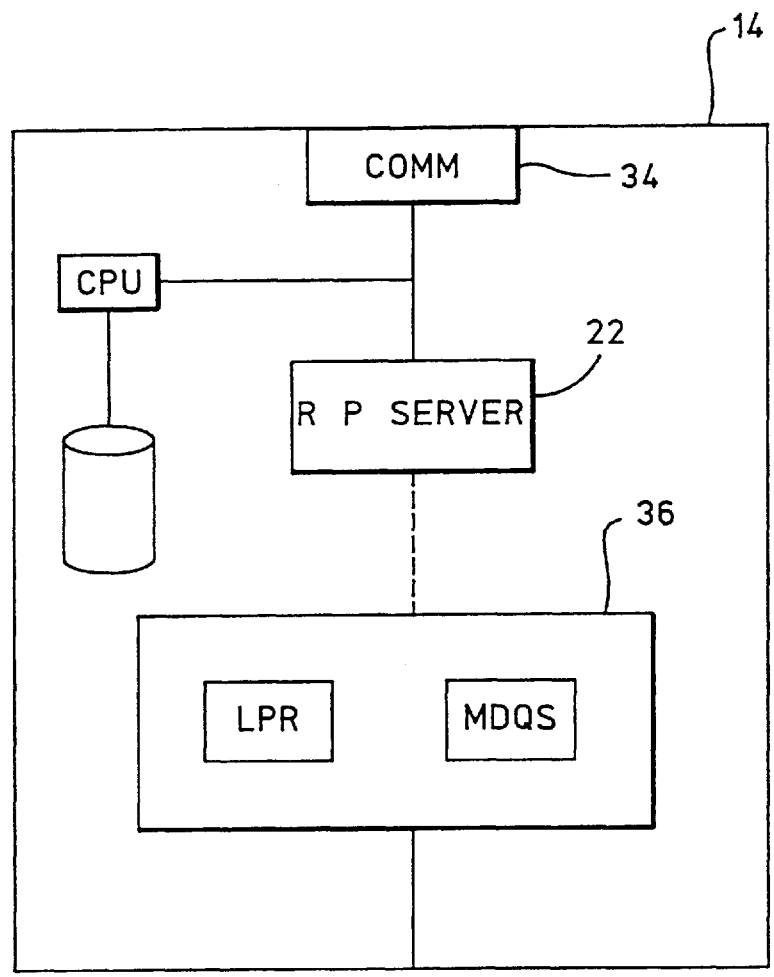
FIG. 2 is a block diagram of the host server illustrated in FIG. 1.

The host server 14 receives the output data file at a host communication interface 34, where the output file is directed to the host printer interface 22. The host printer interface then creates a child process 36 in the host server that handles the printing of the output file on the printer 18 in accordance with the specified spooling protocol. The host server 14 is shown in greater detail in FIG. 2, which illustrates that the host server includes a central processor unit (CPU) 38 that operates under the host server operating system and stores output files in a data memory 40, which typically is a disk storage device. As illustrated in FIG. 2, the host printer interface 22 includes a standard UNIX spooling protocol called LPR, known to those skilled in the art, and also includes a second spooling protocol identified as MDQS. Other spooling protocols can be substituted or added, according to the needs of the user. When the host printer interface creates the child process 34, it specifies the spooling protocol, as will be discussed in greater detail below.

The QPM application of the print manager interface 20 comprises a Microsoft Windows application that executes while the user terminal 12 is operating so as to check for the existence of a print file created by a user application. The QPM application takes print files created by the user application and directs them to the host printer interface 22 via the network 16 as follows. As known to those skilled in the art, under the Microsoft Windows operating system, application output that is to be written to a print file rather than directed to a printer port is written to a file having a .PRN file name extension. Those skilled in the art will appreciate that this redirecting of the application output from the more typical printer port destination is achieved through the Microsoft Windows WIN.INI file.

More particularly, it is well-known to those skilled in the art that a WIN.INI file contains a port definition section in which parallel printer ports such as LPT1, LPT2, and so forth, and serial communication ports such as COM1, COM2, and so forth, are listed. In this way, the Microsoft Windows Print Manager can determine where it should direct output created by applications. Those skilled in the art also know that a file name listed in the WIN.INI port definition section with the format of

[filename].PRN= causes the designated file name to appear in the Microsoft Windows Control Panel Printer Configuration dialog box. That is, the Print Manager will consider the named file to be another output destination, just as if the named file were a printer port.

In accordance with the invention, when the QPM print manager interface 20 is installed in the user terminal 12, a list of multiple output file names is provided. In the preferred embodiment, up to thirty-two output file names can be listed, although it should be understood that the QPM application can be readily changed so that this number can be increased or decreased, as desired. QPM will map each listed output file name to a different printer, such as the printer 18 attached to the host server 14. Thus, the print manager interface 20 is capable of supporting up to thirty-two different printers. This greatly exceeds the typical three or four printer limit usually accessible through the LPT-type printer interfaces. The LPT ports, however, are still accessible at each user terminal for connection to another printer.

In the preferred embodiment, the output file names listed in the WIN.INI file are automatically entered by the QPM application 20 based on a host server print queue and identification code entered in a QPM.INI file supplied with the interface when it is installed. The file names are recognized by the Print Manager and by QPM as being output files and are then assured of being properly processed. For example, if a host server print queue is called "LaserA" and if the host server has an identification code of ten, then the file name listed in the WIN.INI file would be "LASERA10.PRN". This file name is achieved by selecting the first six letters of the print queue name plus a two-digit identification code (to provide the Microsoft Windows eight-character limit for file names) followed by the Print Manager-recognized extension of ".PRN". Thus, if the print queue was "QuickWriter" and the host server identification code was "11", then the file name would be "QUICKW11.PRN". It should be understood that the complete queue name is listed in the QPM.INI file, as described more fully below.

In accordance with well-known facilities available to Microsoft Windows applications, the print manager interface 20 initially operates in a waiting state, continuously checking for the creation of the designated .PRN files. When it detects one of the .PRN files, the interface creates a temporary file in the data storage 30 and renames the .PRN output file to a unique temporary file name. For example, those skilled in the art will appreciate that the temporary name can be made unique by taking several characters from the system clock run by the user terminal CPU as part of the name.

For communication with the network 16 and, ultimately, the host server 14, the QPM print manager interface 20 then causes a network communication channel to be opened so that communication can be established with the host server. Typically, such communication is directed to a predetermined host server port name determined by the particular system organization. The host server name is retrieved by the print manager interface from the QPM.INI file kept in the data storage 30 of the user terminal 12. With communication established, the QPM interface 20 generates a network system Service Request Message that is sent to the host server. The Service Request Message provides a spooling protocol name, host server print queue name, and the size of the output file, which are used by the host printer interface 22 as described further below.

The QPM print manager interface 20 then waits for a positive acknowledgment from the host server 14. Once a positive acknowledgment is received, QPM knows communication is established and that sufficient disk space exists in the host server to receive the output file. The QPM interface therefore begins writing the output file on the communication channel. After the writing has completed and QPM has received a positive acknowledgment, QPM deletes the temporary file from the user terminal data storage 30, closes the communication channel to the host server, and resumes the waiting state, continuously checking for the existence of the listed .PRN files.

Those skilled in the art will appreciate that the QPM interface 20 can initiate communication with the host server 14 only in conjunction with providing the appropriate protocols and instructions. Those skilled in the art also will appreciate that, in the Microsoft Windows operating system, such data is provided in accordance with what are known as data linked list (.DLL) files and also will appreciate that such files can be readily created with knowledge of the particular network protocols with which communication must take place. preferably retrieves these files from the data storage 30. The creation of such files is well within the abilities of those skilled in the art, given the particular network system being used, and therefore it is not necessary to provide the details of the .DLL files.

In the host server 14, the UNIX process of the host printer interface 22 referred to as RP Server is started whenever the host server is started, and automatically establishes communication with the host server, designating the port at which it will receive data. When a Service Request Message arrives at the port, the RP Server creates what is known as a "child process" 34 in the host server operating system to handle the printing of the associated output file. The output file arrives at the host server as specified by the QPM.INI file.

In the preferred embodiment, the host server 14 supports more than one spooling protocol. The particular spooling protocol used by the child process 34 is preferably determined by a code specified in the QPM.INI file and embedded in the Service Request Message. This code is recognized by RP Server and is carried out by the child process. After the child process finishes printing the output file, it sends a positive reply message to the user terminal and closes the communication channel. The child process is then closed by RP Server.

Examples of the QPM.INI file should assist understanding of the interfaces 20 and 22. The first example follows:

[Remote Printer Section of QPM.INI]

Protocols=0

Printer1=Server1 LaserA 10

Printer2=123.123.123.12 QuickWriter 11

The first line simply indicates the section of the QPM.INI file that follows. The next line indicates that the printers to which this user terminal is writing are using a default, user-selected spooling protocol of the host server. The third line indicates that Printer1 (in the preferred embodiment, up to thirty-two printers may be defined) is attached to a host server whose address is Server1, the application output will be directed to the LaserA print queue of Server1, and the host server identification code is ten. In accordance with the description above the Windows Print Manager will give the name "LaserA10.PRN" to output connected to Printer1.

The fourth line of the QPM.INI file above indicates that Printer2 is attached to a host server whose address is 123.123.123.12, output will be directed to the QuickWriter print queue, and the host server identification code is eleven.

In accordance with the description above, the Windows Print Manager will give the name "QUICKW11.PRN" to output connected to Printer2.

The next example of QPM.INI is as follows:

[Remote Printer Section of QPM.INI]

Protocols=1

Printer1=123.123.123.12 LaserA 10

The first line simply indicates the section of the QPM.INI file that follows. The next line indicates that the printer to which this user terminal is writing is using the host server (UNIX-supplied) standard line printer (LPR) spooling system. The last line indicates that Printer1 is attached to a host server whose address is 123.123.123.22, the application output will be directed to the LaserA print queue, and the host server identification code is ten. In accordance with the description above, the Windows Print Manager will give the name "LASERA10.PRN" to output connected to Printer2.

The operation of the print manager interface 20 and host printer interface 22 will be described in greater detail in conjunction with the following pseudocode:

```
QPM: User terminal application
RP_SERVER: (Remote Print Server) Host Server Process
Variable Definitions
   Print_File = File created by user terminal Operating System Print Manager
   Window_Drive = Drive name where Operating System is installed
   Temporary_Print_File = Temporary file to which Print_File is renamed by QPM
   Print_Service_Request = Host server Print Service Request created by Process
         QPM for RP_SERVER
   Spooling_Protocol = User-selected spooling protocol to be used by RP_SERVER
   Queue_Name = Name of host server print queue
   File_Size = Size of Print_File
   Positive_Ack = Flag generated by RP_SERVER indicating success
   Negative_Ack = Flag generated by RP_SERVER indicating failure
   Disk_Space = Disk space available to RP_SERVER for printing
   Child_Process = RP_SERVER-created new process to handle printing
   Temp_UNIX_File = Temporary print file created by RP_SERVER for UNIX
         printing.
QPM
   Check for Print_File in Window_Drive.
   If Print_File is located and File_Size > 0
BEGIN
      Create a unique Temporary_Print_File.
      Rename Print_File to Temporary_Print_File.
      Open communication channel with RP_SERVER over network.
      Generate Print_Service_Request consisting of Spooling_Protocol,
         Queue_Name, and File_Size.
      Send Print_Service_Request to RP_SERVER.
      Wait for Acknowledgment from RP_SERVER.
      If Positive_Ack received from RP_SERVER
      then
         Send Temporary_Print_File to RP_SERVER.
      else GOTO ERROR_CONDITION.
      Wait for Response from RP_SERVER.
      If Positive_Ack received from RP_SERVER
      then
         GOTO SUCCESS_CONDITION.
      else GOTO ERROR_CONDITION.
      ERROR_CONDITION:
         Display ERROR TO USER.
      SUCCESS_CONDITION:
         Remove Temporary_Print_File.
         Close Communication Channel.
      END of Print_File_Check.
      CONTINUE Checking for Print_File.
UNIX PROCESS RP_SERVER
   WAIT for Print_Service_Request.
   If Print_Service_Request is received from QPM of any user terminal
   then CREATE Child_Process to handle printing and GOTO WAIT for
         Print_Service_Request.
   else GOTO WAIT for Print_Service_Request.
   RP_SERVER CHILD PROCESS
      Read Print_Service_Request to find Disk_Space needed to spool the
```

-continued

```
      Temporary_Print_File.
   If Disk_Space > File_Size specified by QPM in Print_Service_Request
   then
      Send Positive_Ack to QPM.
      Create Temp_UNIX_File.
      Receive Temporary_Print_File from QPM in Temp_UNIX_File.
      Execute requested Spooling Protocol.
      If Printing is successful
      then
         Send Positive_Ack.
      else
         Send Negative_Ack.
   else
      Send Negative_Ack.
   Close Child_Process.
   END OF RP_SERVER CHILD PROCESS.
```

In the pseudocode listed above, the variables used in the pseudocode are defined first, and are followed by a description of the print manager interface 20 procedure, followed by a description of the host printer interface 22 procedure. The print manager interface is identified as QPM and the host printer interface is identified as RP_SERVER.

The first line of the QPM pseudocode indicates that QPM checks for the existence of the .PRN print file created by the user terminal in response to an application output. The next line indicates that, if QPM detects the existence of a print file, (that is, a file is created and has data), then a process begins having the first step of creating a unique temporary file. As noted above, a unique file name can be generated using several characters from the user terminal system clock. The next line of pseudocode indicates the QPM renames the print file from the print manager to the unique temporary file name. The next line indicates that QPM opens a communications channel with the host printer interface RP_SERVER, a UNIX-based process in the preferred embodiment. The next line of pseudocode indicates that QPM generates a print service request that includes a specified spooling protocol, host printer queue name, and the file size of the temporary print file. Next, QPM sends the print service request to the RP_SERVER in the host server and waits for an acknowledgment.

If the acknowledgment received from RP_SERVER is a positive acknowledgment, then QPM sends the temporary print file to RP_SERVER over the network. As noted above, this involves the use of the appropriate network protocols and is dependent upon a user's particular network configuration. If a positive acknowledgment is not received from RP_SERVER, then QPM initiates an error condition in which an error is displayed to the user. Processing by QPM then stops.

After QPM has sent the temporary print file to RP_SERVER, it waits for a response from RP_SERVER. A positive acknowledgment indicates that RP_SERVER has successfully printed the temporary print file. Therefore, if a positive acknowledgment is received from RP_SERVER, QPM goes to the success condition, which comprises removing the temporary print file from the user terminal data storage and closing the communication channel over the network. This ends the QPM processing of a print file. If a positive acknowledgment is not received from RP_SERVER following transmission of the temporary print file, then QPM goes to the error condition as described above.

In the RP_SERVER pseudocode, the first line indicates that the RP_SERVER UNIX process waits for a print service request from one of the user terminals. If a print service request is received, then RP_SERVER creates a UNIX child process to handle the printing of the associated temporary print file. RP_SERVER then continues waiting for receipt of another print service request.

Turning to the RP_SERVER Child Process pseudocode, the first line indicates that the child process reads the print service request to determine the disk space needed for temporarily storing, also called spooling, the temporary print file. If the available disk space is greater than the file size specified by the print service request, then the child process sends a positive acknowledgment back to QPM, indicating that it is ready to receive the temporary print file. The RP_SERVER child process next creates a temporary UNIX file. As noted above, many different operating systems can be employed and therefore it should be understood that a temporary UNIX file is specified only because, in the preferred embodiment, RP_SERVER operates under a UNIX-based operating system. If other operating systems are used, temporary files will be created by the RP_SERVER child process in accordance with those other operating systems.

After the RP_SERVER child process has created the temporary UNIX file, it receives a temporary print file from QPM and places it in the temporary UNIX file. The RP_SERVER child process then executes the requested spooling protocol. Those skilled in the art will recognize that a variety of spooling protocols may be desired. That is, different print job queuing schemes comprising spooling protocols can be used. Spooling protocols are well-known and need no further explanation in this context.

If the RP_SERVER child process determines that the printing operation was successful, it then sends a positive acknowledgment back to QPM. It otherwise sends a negative acknowledgment. A negative acknowledgment ends the child process operation. Similarly, child process operation is ended and a negative acknowledgment is sent to QPM if insufficient disk space is available for the size of the temporary print file.

Figure 3:
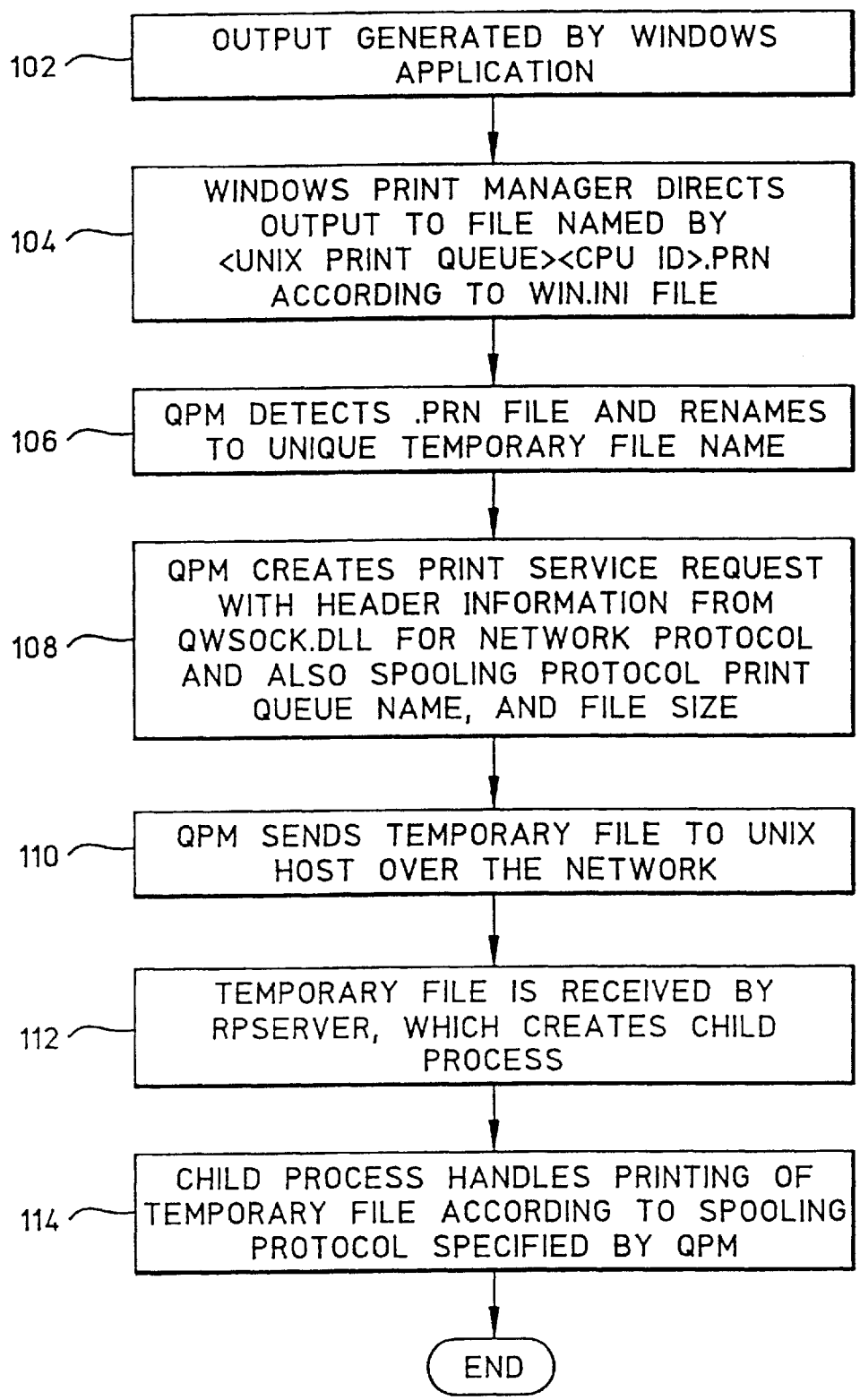
FIG. 3 is a flow diagram illustrating the operating steps of the printer interface provided by the system illustrated in FIG. 1.

The operation of the print manager interface and host server printer interface can be better understood with reference to the flow diagram of FIG. 3. The flow diagram illustrates the processing that an output file undergoes in the system of the preferred embodiment illustrated in FIG. 1. In the first step, the flow diagram box numbered 102 indicates that a Windows-based application generates an output file. The next flow diagram box numbered 104 indicates that the Microsoft Windows Print Manager directs the output created by the application to a file named by concatenating the first six characters of the host server print queue name with a two-character host server CPU identification code, followed by the .PRN file extension recognized by the print manager. The flow diagram box also indicates this information is maintained in the Microsoft Windows WIN.INI file.

The next flow diagram box numbered 106 indicates that QPM detects the .PRN file creation and renames it to a unique temporary file name. The print manager must first name the output from the application to a predetermined file name so that QPM can recognize the file. QPM must then rename the file so it can pass the file on and be ready to receive the next output file from the print manager. It should be readily apparent that, as the Print Manager receives output from a plurality of application programs all intended for the same host server printer, Print Manager will package such output in identically-named output files with the .PRN extension and pass them on to QPM. QPM in turn will rename these files as it receives them.

The next flow diagram box numbered 108 indicates that QPM creates a print service request with header information retrieved from the data linked list files described above, which in the preferred embodiment are called "QWSOCK-.DLL". Those skilled in the art will recognize that the particular name selected for the .DLL file is of no consequence for particular implementations of the invention. The flow diagram box numbered 108 indicates that the print service request also specifies the spooling protocol desired, (obtained from the QPM.INI file), the host server print queue name, and the file size of the temporary file. The flow diagram box numbered 110 indicates that the next step is for QPM to send the temporary file to the host server over the network. As indicated, the host server in the preferred embodiment is UNIX-based but other operating systems can be selected, as desired. The next flow diagram box, numbered 112, indicates that after the temporary file is received by the host server RP_SERVER process, a child process is created to handle the printing. The last flow diagram box numbered 114 indicates that the child process handles the printing of the temporary file according to the spooling protocol supported by the host server and specified by QPM. This ends the processing of the application output.

Figure 4:
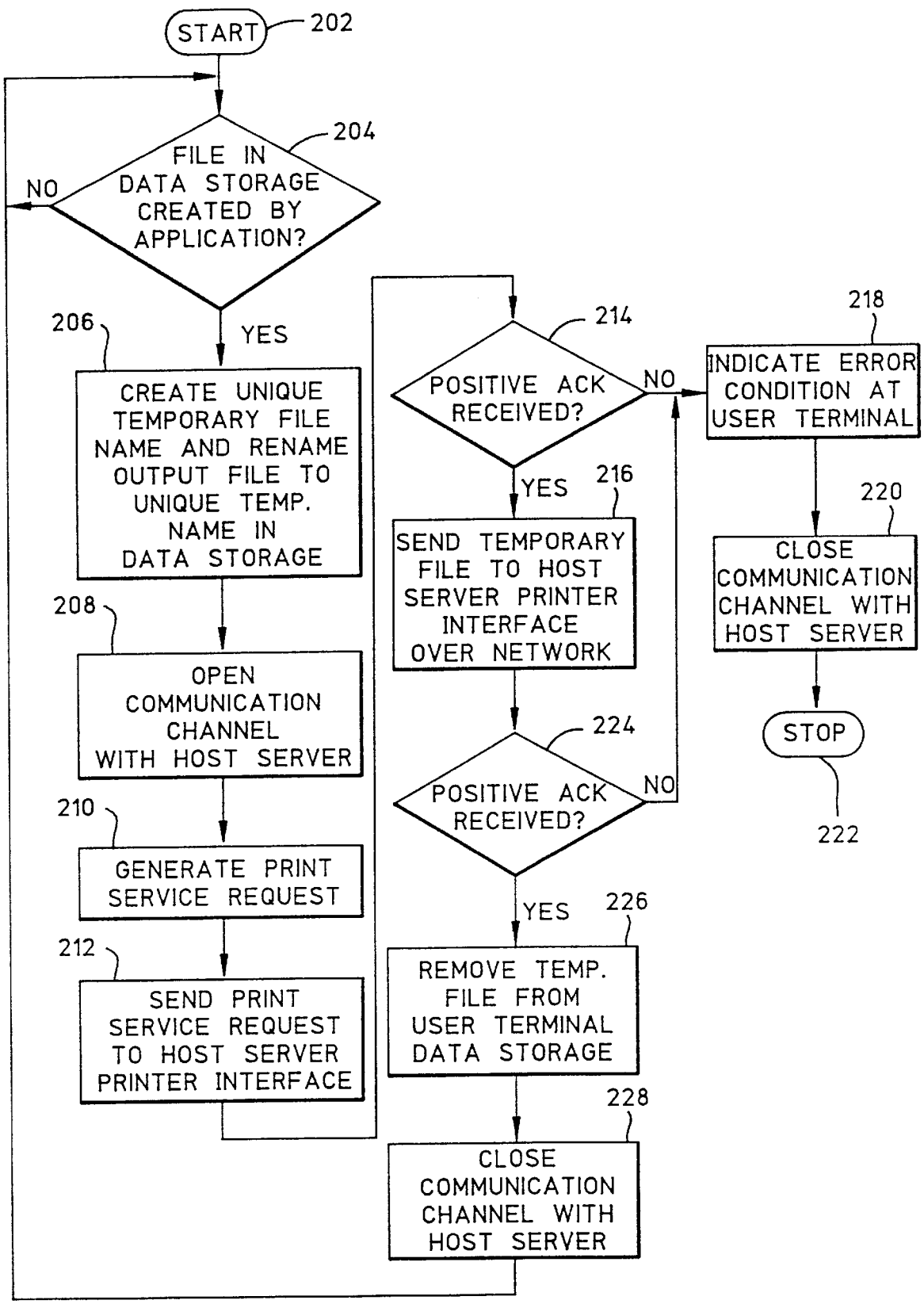
FIG. 4 is a flow diagram illustrating the operating steps of the user terminal print manager interface illustrated in FIG. 1.

The FIG. 4 flow diagram illustrates the processing of the print manager interface, which resides in the user terminal. The print manager interface includes an application program that operates in accordance with the operating system of the user terminal. For simplicity and purposes of illustration, the print manager interface and application program will be jointly referred to as "QPM".

The start of QPM is indicated in FIG. 4 by the start box 202, which leads directly to a decision box 204, where QPM checks to determine if a print file named according to the user terminal operating system initiation file has been created by a user terminal application program. The print file will be stored in the data storage of the user terminal. As noted above, in the case of the preferred embodiment operating under Microsoft Windows, QPM checks for a predetermined .PRN file created by the Print Manager program, as specified by QPM.INI and WIN.INI initiation files. Those skilled in the art will understand how to create the appropriate .INI files for the Microsoft Windows system and therefore further explanation is not necessary.

With further reference to the Microsoft Windows operating system of the preferred embodiment, the Print Manager program will give the output print file a name that comprises the first six characters of the host server printer queue to which the output print file is destined and a two-digit host server identification code assigned by the computer network for the corresponding host server. This comprises the eight-character file name that is the limit for Microsoft Windows files. In this way, QPM will be able to search for the output files for which it has responsibility and can determine where such files should be sent.

If QPM detects that one of the predetermined output print files has been created, then at the next flow diagram box 206 QPM creates a unique temporary file name and renames the predetermined output print file in the user terminal data storage so that it has a unique temporary file name. The unique temporary file name is easily created, for example, using several characters from the user terminal clock. Because QPM now has an output file to send to the host server, it must establish communication. Therefore, the next flow diagram box 208 illustrates that QPM next opens a communication channel with the host server. The details of this step depend upon the user terminal operating systems and the particular network in which the user terminals operate, but will be understood by those skilled in the art.

In the Microsoft Windows operating system, for example, data files provided with a file name extension of .DLL are understood to refer to data files that contain information used in maintaining program-to-program or system-to-system interfaces. The QPM program similarly makes use of such data files in establishing communication with the host server through the network communication software being used by the user terminals. Vendors of network software typically provides sufficient information with their software such that those skilled in the art can easily create the necessary .DLL files for QPM. That is, rather than create a different software package for each different network vendor with which QPM must operate, it only is necessary to create different .DLL files.

In establishing communication with the host server, most network systems generate a positive acknowledgment (referred to here as a "positive ack") signal, which indicates to the QPM program of the user terminal that a communication channel has been established with the desired host server and that desired data exchange can take place.

With communication established, QPM next generates a request to use a printer attached to the host server, as indicated by the next flow diagram box 210. The request specifies the printer, corresponding host server, and spooling protocol for the output file. In the case of the Microsoft Windows system, the request is generated using the information specified in the WIN.INI file. Those skilled in the art will appreciate that the name of the exact request signal or communication artifact used by different networks to indicate a need for printer time can be different from that used here. In any case, QPM generates the request for printer services at flow diagram box 210 and sends the request to the host server at box 212.

After sending the print service request, at box 214 QPM waits to receive back an acknowledgment indicating the status of the communication. If the user terminal QPM receives a positive ack, then at box 216 QPM sends the temporary output print file (which it earlier renamed) to the host server printer at the network port of the host server. The exact nature of the communication between user terminal and host server, as indicated above, will depend upon the system being used by the user. Those skilled in the art will understand such details, given the particular network system begin used. If the user terminal does not receive a positive ack, then at box 218 it indicates an error condition to the user. Such an indication can comprise, for example, a message displayed on a display screen of the user terminal. At box 220, the host server communication channel is closed and at box 222 the QPM program is stopped.

After the temporary output print file has been sent to the host server at the flow diagram box numbered 216, QPM waits at box 224 for a positive acknowledgment indicating a successful print. If a positive ack is not received, then QPM indicates an error condition by performing the steps illustrated at flow diagram boxes 218–222 as described above. If a positive ack is received, then at flow diagram box 226 QPM removes the temporary output data file from the user terminal storage memory, at box 228 closes the communication channel with the host server, and returns to waiting for the next output created by an application at the START flow diagram box 202.

Figure 5:
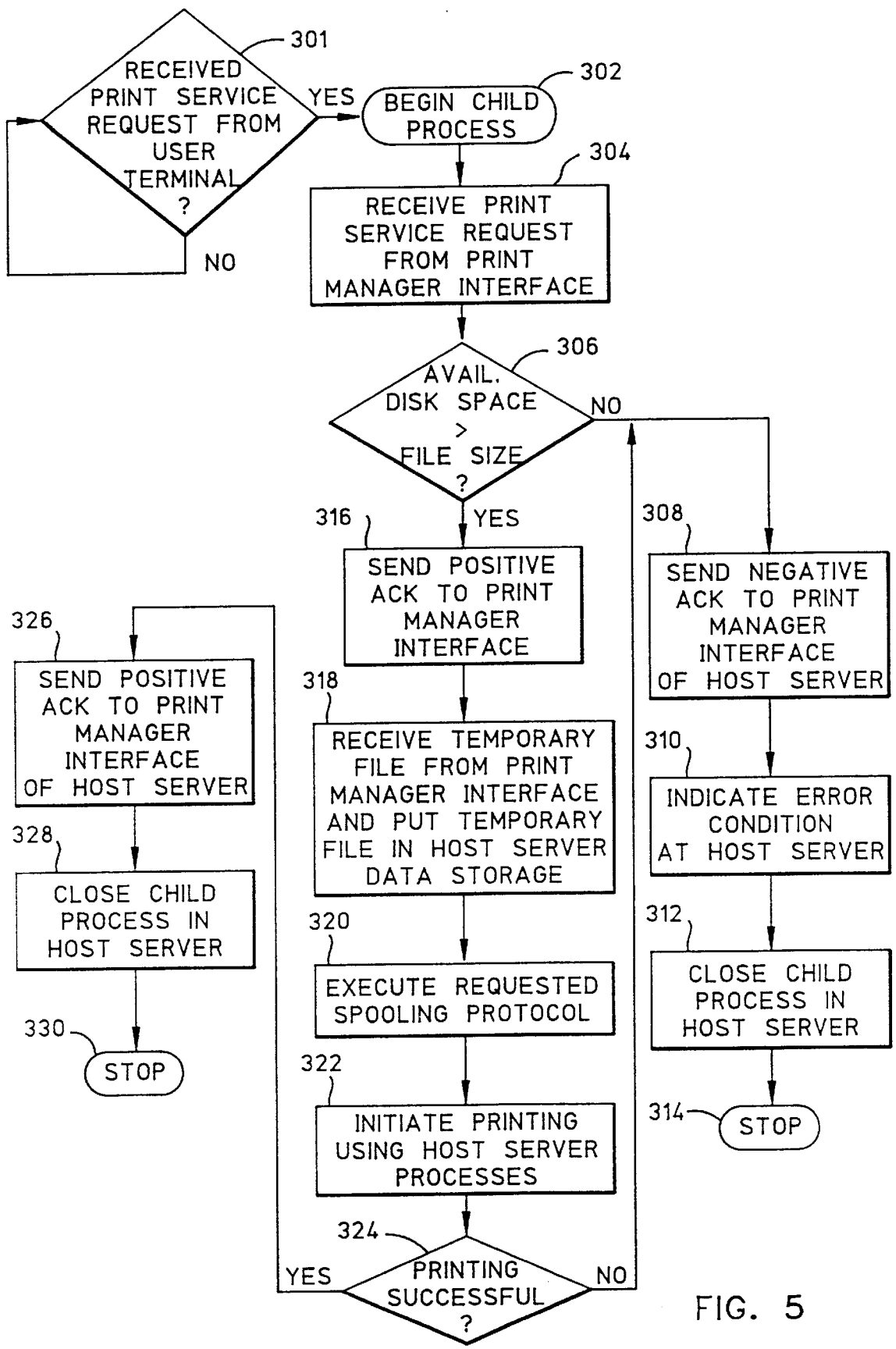
FIG. 5 is a flow diagram illustrating the operating steps of the host server printer interface illustrated in FIG. 1.

The FIG. 5 flow diagram illustrates the processing of the host server print interface, which resides in the host server. The host server print interface includes an application program that operates in accordance with the operating system of the host server to provide the remote printing described above. For simplicity and purposes of illustration, the host server printer interface and application program will be jointly referred to as "RPSERVER".

Like the QPM flow diagram, FIG. 5 shows that the start of RPSERVER is a decision box 301 leading back to itself, indicating that RPSERVER also starts and remains in a waiting condition. The waiting in the case of RPSERVER is explained in the decision box as being a wait for a print service request from a user terminal. If no print service request is received, then RPSERVER continues to wait. If a print service request is received, then RPSERVER begins a child process, as indicated by the flow diagram box numbered 302. Those skilled in the art will recognize that the child process refers to a host server operating system process that can be created by a parent process, which in the present case is RPSERVER. Such a feature is supported, for example, by UNIX-based systems such as used in the preferred embodiment. In FIG. 5, a dotted line leads back to the start decision box 201 to indicate that RPSERVER continues to check for a print service request even after it creates the child process for handling a specific request.

In the child process, the first step indicated by the flow diagram box 304 is to receive the print service request from the user terminal print manager interface, which typically is delivered to a predetermined host server port (not illustrated). Next, at decision box 306, RPSERVER checks to determine if the host server storage space available for printing is greater than the file size specified in the print service request it received. If insufficient space exists to handle the request, then at box 308 RPSERVER sends a negative ack to the QPM of the user terminal that sent the request. More particularly, a negative ack is sent to the predetermined host server port and user terminal print manager interface at which the request was received. Network software then delivers it to the appropriate user terminal. At box 310, RPSERVER then indicates an error condition as described above for the QPM program, and then closes the child process at box 312. The RPSERVER processing ends at the stop box numbered 314.

If the available host server storage for the output print file is sufficient, then at box 316 RPSERVER sends a positive ack to the user terminal print manager interface. The user terminal then will send the temporary output print file, whose receipt is indicated at box 318, and the file is stored in the host server data storage file structure for printing. In accordance with the present invention, multiple spooling protocols can be supported for printing, as indicated by the next flow diagram box 320. The spooling protocols to be supported will be determined by the user. Those skilled in the art will understand how to implement the user-determined spooling protocols and therefore further explanation is not required. Finally, at box 322, the child process initiates printing on the printer attached to the host server.

If printing of the output print file is successful, then after the decision box 324, RPSERVER sends a positive ack back to the user terminal printer manager interface at box 326 and closes the child process at box 328, stopping RPSERVER processing at box 330. If printing is unsuccessful, a negative outcome at the decision box 324, then RPSERVER carries out the error processing described above in connection with flow diagram boxes 308–314.

Thus, in accordance with the invention, a print manager interface in user terminals of a computer network detects output generated by user applications, prepares the output for transmission to a network host server so that a remote printer and spooling protocol are designated, and initiates transmission of the prepared output in accordance with the network protocol. A host printer interface in each host server of the network receives the prepared output from a user terminal and creates a host child process that initiates printing of the prepared output at the designated printer according to the designated spooling protocol. The child process is then closed. The print manager interface and host print interface constructed in accordance with the invention support respective different operating systems such that the differences are transparent to the user and support a relatively large number of remote printers with a variety of spooling protocols.

The present invention has been described above in terms of a presently preferred embodiment so that an understanding of the present invention can be conveyed. There are, however, many configurations for network printer interfaces not specifically described herein but with which the present invention is applicable. The present invention should therefore not be seen as limited to the particular embodiment described herein, but rather, it should be understood that the present invention has wide applicability with respect to network printer interfaces generally. All modifications, variations, or equivalent arrangements that are within the scope of the attached claims should therefore be considered to be within the scope of the invention.

We claim:

1. A combination for use in an interactive computer system having one or more user terminals that are connected to at least one host server and communicate via a network system protocol and having a printer connected to one of the host servers, the combination including:

a print manager interface in each user terminal that detects output generated by an application process of the user terminal and automatically stored by a user terminal print manager process, stores the output in a named output file according to a predetermined naming scheme, prepares the named output file for transmission to one of the host servers designated by the user terminal application process, and initiates transmission of the prepared output file in accordance with the network protocol; and a host printer interface in each host server that receives an output file from a user terminal and in response creates a host print process that initiates printing of the prepared output file at a printer designated by the user terminal through the application process.

2. A combination as defined in claim 1, wherein the host printer interface initiates the printing according to one of a plurality of spooling processes designated by the print manager interface.

3. A combination as defined in claim 2, wherein each print manager interface designates the spooling process to be used as part of the prepared output file and each host printer interface determines the designated spooling process from the prepared output file.

4. A combination as defined in claim 1, wherein each user terminal directs output generated by an application process to a user terminal output file whose name specifies a destination host server.

5. A combination as defined in claim 4, wherein the print manager interface automatically selects the name of the output file in accordance with a specified host server and printer queue name.

6. A combination as defined in claim 5, wherein the print manager interface selects the name of the output file by combining the name of the specified host server and printer queue to a name that is recognized by the host printer interface.

7. A combination as defined in claim 5, wherein the host server and printer queue name are specified by a user in a user terminal initiation file.

8. A combination as defined in claim 1, wherein the user terminal initiates the transmission of the prepared output file by opening a communication channel to a host server specified by the output file name.

9. A combination as defined in claim 8, wherein the output file name is specified in a user terminal initiation data file.

10. A combination as defined in claim 1, wherein each application process designates a host server by including a host server identification code in the generated output file.

11. A combination as defined in claim 1, wherein at least one of the user terminals operates according to an operating system different from the operating system of the host server to which the printer is connected.

12. A printer emulation system for use in an interactive computer system having one or more user terminals that operate in accordance with a terminal operating system and include terminal data storage, at least one host server that operates in accordance with a server operating system that is different from the terminal operating systems, a printer that receives print files from one of the host servers and prints them, and a network system that permits the user terminals to communicate with the host servers in accordance with a network protocol, the user terminals having one or more applications that execute and generate output, the printer emulation system including:

a terminal-host printer interface in each user terminal that detects the creation of an output file created by a user terminal application according to one of a plurality of predetermined output file names, renames the output file to a unique temporary file name, and sends the renamed output file to a user-designated host server in accordance with the network protocol;

a host server printer interface in each host server that detects a renamed output file from a user terminal, and creates a host server print process that receives the renamed output file and provides it to a user-designated printer.

13. A printer emulation system as defined in claim 12, wherein:

the host server printer interface directs the host server print process to print the renamed output file in accordance with one of a plurality of spooling processes specified by the user terminal.

14. A combination as defined in claim 12, wherein the terminal-host printer interface automatically selects the name of the temporary file name in accordance with a specified host server and printer queue name.

15. A combination as defined in claim 14, wherein the terminal-host printer interface selects the temporary file name by combining the name of the specified host server and printer queue to a name that is recognized by the host server printer interface.

16. A combination as defined in claim 14, wherein the host server and printer queue name are specified by a user in a user terminal initiation file.

17. A printer emulation system comprising:

one or more user terminals;

one or more host servers;

a network system connecting a user terminal and host server for communication via a network protocol;

at least one printer connected to one of the host servers;

a print manager interface in the user terminal that detects output generated by an application process of the user terminal, prepares the output for transmission to one of the host servers designated by the application process, and initiates transmission of the prepared output in accordance with the network protocol; and a host printer interface in the host server that receives prepared output from the user terminal and creates a host print process that initiates printing of the prepared output at a printer designated by the application process.

18. A printer emulation system as defined in claim 17, wherein the host server includes a plurality of spooling processes, one of which is designated by the print manager interface of the user terminal.

19. A printer emulation system as defined in claim 18, wherein the print manager interface designates the spooling process to be used as part of the prepared output and the host printer interface retrieves the designated spooling process from the prepared output.

20. A printer emulation system as defined in claim 17, wherein the user terminal directs output generated by an application process to a user terminal temporary data structure.

21. A printer emulation system as defined in claim 20, wherein the print manager interface automatically selects the name of the temporary data structure in accordance with a specified host server and printer queue name.

22. A printer emulation system as defined in claim 21, wherein the print manager interface selects the name of the temporary data structure by combining the name of the specified host server and printer queue to a name that is recognized by the host printer interface.

23. A printer emulation system as defined in claim 21, wherein the host server and printer queue name are specified by a user in a user terminal initiation file.

24. A printer emulation system as defined in claim 17, wherein the user terminal initiates the transmission of the prepared output by opening a communication channel to a host server specified by the application process.

25. A printer emulation system as defined in claim 24, wherein the host server is specified by a user in a user terminal initiation data structure.

26. A printer emulation system as defined in claim 17, wherein each application process designates a host server by including a host server identification code in the generated output.

27. A printer emulation system as defined in claim 17, wherein the user terminal operates according to an operating system different from the operating system of the host server to which the printer is connected.

28. A method of permitting a user terminal connected to a host server by a network to send output created by a user terminal application executing according to a terminal operating system to a printer connected to the host server and printing according to a host server operating system different from the terminal operating system, the method comprising the steps of:

detecting the creation of application output from a user terminal application process and placing it in a data structure of the user terminal having a unique temporary print file name;

sending the temporary print file and a predetermined host server printer protocol from the user terminal over the network if communication with the host server is established, and otherwise removing the temporary print file from the predetermined directory and indicating an error condition;

creating a host server print process that prints the temporary print file at a printer designated by the user terminal application process and closing the host server print process.

29. A method as defined in claim 28, wherein the step of detecting and placing comprises the steps of:

directing the application output to a print file in a predetermined directory of the user terminal;

detecting the creation of a print file in the predetermined directory;

renaming the print file to a unique temporary print file name in accordance with a user-specified host server print queue and host server identification code.

30. A method as defined in claim 28, wherein the step of sending the temporary print file comprises the steps of:

generating a print service request that specifies a printer spooling protocol, a host server queue name, and temporary print file size and providing the print service request to the host server; and sending the temporary print file from the user terminal over the network to the host server if a positive acknowledgment of the print service request is received from the host server, indicating that communication is established, and otherwise removing the temporary print file from the predetermined directory and indicating an error condition.

31. A method as defined in claim 28, wherein the host print process prints the temporary print file if there is sufficient host server storage space to contain the size of the temporary print file and otherwise carries out the specified spooling protocol for printing the temporary print file.

32. A method of printing output from an application process of a user terminal operating according to a first operating system on a printer connected to a host server operating according to a second operating system, the user terminal and host server communicating via a network protocol, the method comprising the steps of:

directing output generated by a user terminal application process to a user terminal temporary data structure;

detecting the temporary data structure;

renaming the temporary data structure to a temporary output file name in accordance with a specified host server and printer queue name specified by a user terminal in a user terminal initiation file;

preparing the temporary output file for transmission to the host server designated by the user terminal application process by specifying a spooling process;

opening a communication channel to a host server specified by the user terminal application process;

initiating transmission of the prepared output in accordance with the network protocol;

receiving prepared output from a user terminal; and creating a host print process that initiates printing of the prepared output at a printer designated by the user terminal application process in accordance with the spooling protocol.

33. A method as defined in claim 32, wherein the temporary output file name in the step of renaming is selected by combining the name of a host server and printer queue specified by a user in a user terminal initiation data structure.

34. A method as defined in claim 32, wherein the step of renaming further comprises the steps of:

including a host server identification code and printer queue name from the user terminal initiation file in the generated output; and combining the host server identification code and the printer queue in the temporary output file.

* * * * *